United States Patent [19]

Ahern et al.

[11] Patent Number: 4,793,178
[45] Date of Patent: Dec. 27, 1988

[54] METHOD AND APPARATUS FOR GENERATING DATA AND ANALYZING THE SAME TO DETERMINE FLUID DEPTH IN A WELL

[75] Inventors: Timothy K. Ahern, Tulsa; Phillip J. Cebuhar, Lawton, both of Okla.

[73] Assignee: Xelo, Inc., Tulsa, Okla.

[21] Appl. No.: 37,738

[22] Filed: Apr. 13, 1987

[51] Int. Cl.$^4$ ............................................. G01F 23/00
[52] U.S. Cl. ................................... 73/151; 73/290 V; 417/36
[58] Field of Search ............... 417/36; 73/290 V, 151; 166/250

[56] References Cited

U.S. PATENT DOCUMENTS

| | | | |
|---|---|---|---|
| 3,316,997 | 2/1965 | McCoy | 181/0.5 |
| 3,915,256 | 10/1975 | McCoy | 181/0.5 |
| 4,318,674 | 3/1982 | Godbey et al. | 417/36 |
| 4,389,164 | 6/1983 | Godbey et al. | 417/36 |
| 4,408,676 | 10/1983 | McCoy | 181/113 |
| 4,689,744 | 8/1987 | Zeller et al. | 73/151 X |

Primary Examiner—Jerry W. Myracle
Attorney, Agent, or Firm—Laney, Dougherty, Hessin & Beavers

[57] ABSTRACT

Method and apparatus for generating data and analyzing the same to determine fluid depth in a well. A gun assembly includes a pressurized chamber for initiating an acoustic pulse and a transducer for measuring pressure variations. The gun assembly is mounted on a well casing at the top thereof. An acoustic pulse is initiated and reflections from tubing collars, well equipment, perforation zones and the fluid level surface are detected by the transducer and converted to an analog signal which is digitized and stored in a memory. The stored data is processed to detect the fluid pulse reflection in view of a set of preselected pulse criteria. Acoustic pulse velocity is calculated by correlating the tubing collar depths, which are stored in the memory, with peaks in the acoustic log which indicate a corresponding tubing collar.

43 Claims, 7 Drawing Sheets

METHOD AND APPARATUS FOR GENERATING DATA AND ANALYZING THE SAME TO DETERMINE FLUID DEPTH IN A WELL

BACKGROUND OF THE INVENTION

1. Field of the Invention

The instant invention relates to methods and apparatus for well fluid level control and more particularly to such methods and apparatus in which the fluid level in a well is sensed by initiating an acoustic pulse at the top of the well and detecting the pulse reflected from the fluid surface.

2. Background of the Invention

In most oil and gas wells, especially toward the end of the producing life of the well, it is necessary to pump well fluids to the surface of the well because the pressure in the formation from which the well is producing is insufficient to force well fluids to the surface.

Pumps on oil wells typically comprise either a downhole submersible electric pump or a beam pumping unit which raises and lowers a string of sucker rods in the well. Regardless of the pump type, well production can be optimized and equipment wear minimized by on and off cycling of the pump for appropriate intervals. It is desirable to control the pump by switching it on when the fluid column rises above a preselected level and switching it off when it falls below a preselected level. As fluid flows from the formation into the well bore, the fluid level in the well rises. Typically, at some point as the height of the fluid column increases, fluid influx into the well is reduced. If the pump is not energized before the decrease in well influx, production is not occurring at an optimum rate. At the other extreme, if the pump turns on too soon, the pump is cycling on and off at a fairly rapid rate and may be drawing the fluid level down below the pump input thereby permitting gas to enter the pump. Such a condition increases pump wear and causes hammering of sucker rods, flexing in tubing strings and other undesirable effects.

There exists a number of prior art pump controllers for switching the pump on when the fluid level in the well rises above a first preselected level and switching it off when the fluid level falls below a second preselected level below the first preselected level. Such prior art units typically include means for initiating an acoustic shot or pulse at the surface of the well which travels down the well bore and is reflected from the fluid surface in the well back to the surface. The reflected pulse is detected at the surface and the time between initiation of the shot and detecting the reflected pulse is measured thus providing an indication of the fluid level when the velocity of the pulse is known. Some of the prior art controllers includes means for selecting high and low fluid levels at which the pump is automatically turned on and off, respectively.

Such prior art controllers suffer from several disadvantages.

One such prior art controller produces a rough estimate of fluid level depth by starting a timer simultaneously with a signal which opens a solenoid in order to release pressurized gas thereby generating an acoustic pulse in the well. The pulse travels down the well toward the well fluid and is reflected therefrom back to the surface. A transducer in the well adjacent the surface detects pressure and converts the same to an electrical signal. A threshold circuit is set to stop the timer when the monitored electrical signal rises above a preselected level. The time so generated is converted to a depth by multiplying the same by the estimated velocity of the acoustic pulse in the well.

The above-described prior art system suffers from a number of drawbacks. First, the surface of the fluid column in the well is typically not the only source of reflected acoustic pulses which are detected by the transducer. Any change in the cross-sectional area of the well bore causes a pressure change to be reflected back to the surface. For example, in the case in which a production tubing string is suspended in the well bore, the pulse is transmitted in the annulus between the tubing string and the casing. Each set of tubing collars, at which adjacent joints of production tubing are connected, decreases the cross-sectional area of the well annulus and thus reflects acoustic energy back toward the surface. Well equipment such as centralizers, tubing anchors and the like also decrease annulus area thus generating reflected pulses which are detected at the surface. In addition, fluid influx into the well at perforation zones reflects acoustic energy back toward the surface. In a similar fashion, when annulus cross-sectional area increases, due to, e.g., an opening in the casing, a pressure reduction is detected at the surface. Thus, it can be seen that pulses generated by a number of sources are detected at the surface. In addition to pulses generated by such area changes there are often significant levels of mechanical and/or electrical noise which is detected by the transducer at the top of the well.

The prior art fluid depth controllers of the type described often mistake detected pulses which are produced by, e.g., well equipment, or which appear as a result of electrical or mechanical noise as the pulse reflected from the fluid surface. Any pulse which has a magnitude greater than that selected in the threshold circuit stops the counter. Pulses generated by well anomalies such as equipment or producing zones or by noise can be mistaken for the pulse reflected from the well fluid thus producing a depth indication which is incorrect.

Another problem relating to such prior art controllers is that estimates of the acoustic pulse velocity are typically crude thus introducing additional error into depth calculations even if the pulse travel time should happen to be reasonably correct. In addition, once a velocity estimate is entered, it remains fixed. Since velocity can vary from shot to shot, error is introduced. One prior art technique for estimating velocity is simply to assume a given velocity. However, velocities can vary significantly depending upon the pressure, temperature, and composition of the gas column in the well above the fluid. One prior art controller similar to that described above may be calibrated in a crude manner which attempts to take such velocity changes into account. Successive shots are fired to locate a pair of adjacent tubing collars. The difference in the depth readings for the adjacent collars is the tubing joint length and provides a means of calibration based on the known distance between the collars. Since velocity is calculated only over the length of a single tubing joint, small percentage errors, in the range, of e.g., 1 to 2 percent, show up as errors of 150 to 300 feet in a fluid depth indication for a well in the 15,000 feet range. Such errors are totally unacceptable if it is desired to have a low set point for the fluid level of, e.g., 50 feet above the pump. Such a set point could not be set on the prior art system without any assurance that the pump would not be energized until the fluid level reached the pump inlet thereby entraining gas into the pump.

All of the prior art systems process the monitored data in real time. It would be desirable to store the data and analyze the same to extract information relating to the relative heights of the pulse peaks, the shape of the peaks, etc. in order to extract useful information for determining the fluid level depth.

SUMMARY OF THE INVENTION

The instant invention comprises a method for generating data and analyzing the same to determine fluid depth in a well. An acoustic pulse is initiated at the top of the well. The pressure at the top of the well is continuously monitored for pressure pulses indicative of acoustic pulse reflections produced by variations in the cross-sectional area of the well. The monitored pressure is converted to a proportional electrical signal which is periodically sampled. The resulting samples are stored in a memory device. In one aspect of the invention, the stored samples are analyzed in view of the known positions of tubing collars in the production string to estimate acoustic pulse velocity. In another aspect of the invention, each detected pulse is analyzed to determine whether or not it includes preselected criteria indicative of a pulse reflected from the fluid surface.

Apparatus is provided for performing the steps of the method.

It is an object of the present invention to provide a method and apparatus for generating data indicative of fluid depth in a well in which data indicative of acoustic energy reflected from the well bore is stored and analyzed to determine the depth of the fluid level.

It is a more specific object of the invention to provide such a method and apparatus in which reflected pulses are analyzed in view of preselected criteria to identify the pulse reflected from the fluid surface.

In one aspect of the invention, it is an object of the invention to provide such a method and apparatus in which acoustic pulse velocity is calculated for each acoustic pulse.

It is another object of the invention to average successive velocity calculations in order to increase the precision of the acoustic pulse velocity estimate.

It is another object of the invention to provide such a method and apparatus in which such analysis is conducted with reference to the location of well anomalies such as well equipment, perforation zones and the like.

These and other objects and advantages of the instant invention will become more fully apparent when the following detailed description is read in relation to the accompanying drawings, wherein.

Figure 7A:
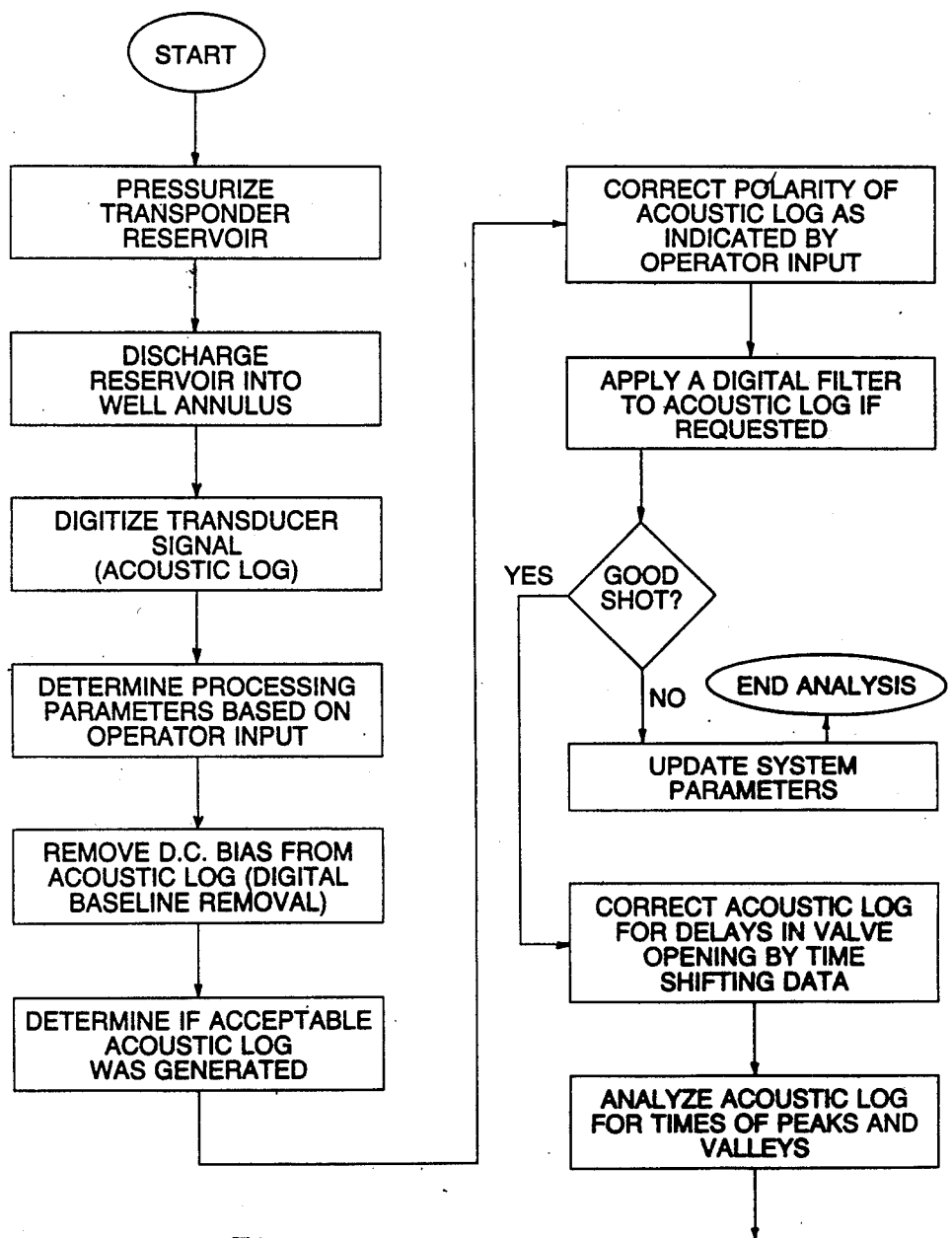
Figure 7B:
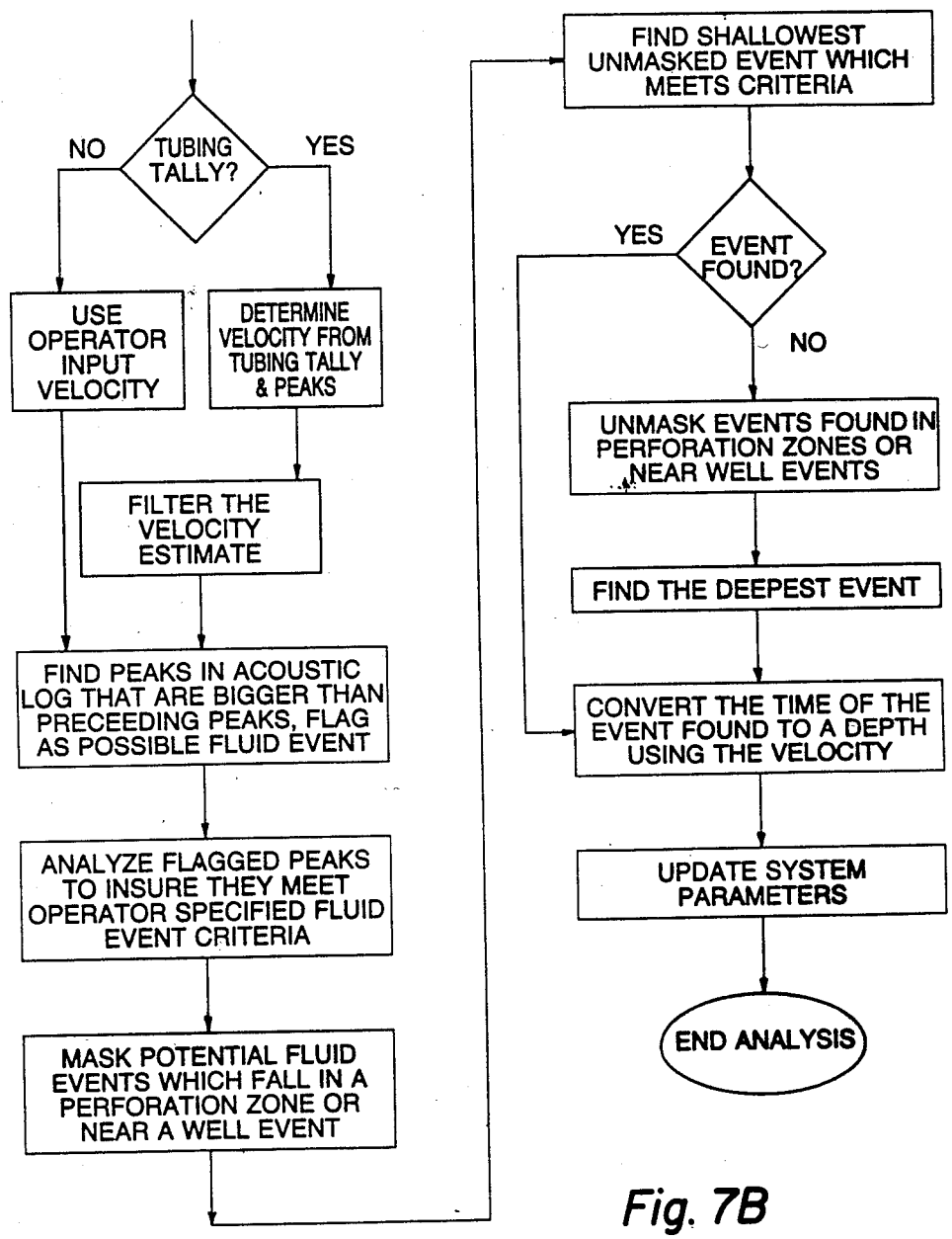

FIGS. 7A and 7B comprise a flow chart which details the steps in a software program comprising a portion of the instant embodiment of the invention.

DETAILED DESCRIPTION OF THE PREFERRED EMBODIMENT OF THE INVENTION

Figures 1, 2:
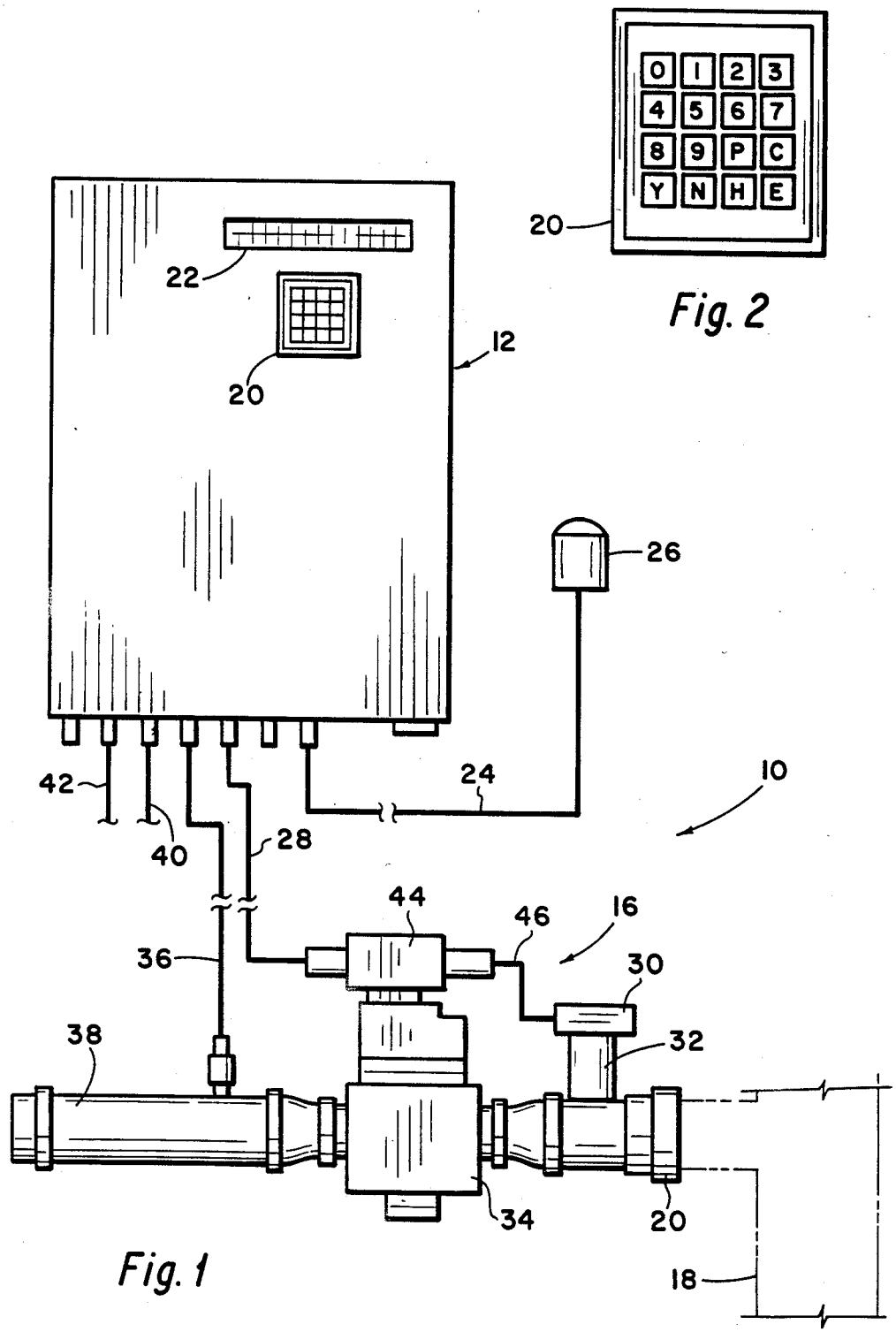
FIG. 1 is a view of the instant embodiment of the invention connected to a well casing at the surface of the well with the transponder being enlarged relative to the cabinet.
FIG. 2 is an enlarged view of the keypad shown in FIG. 1.

Indicated generally at 10 in FIG. 1 is apparatus constructed in accordance with the instant invention. Included therein is a cabinet 12, which encloses electronic circuits and an air compressor, and a transponder or gun assembly 16. Gun assembly 16 is mounted on a casing 18 via connector 20. The gun assembly is referred to herein as means for initiating an acoustic pulse. The casing extends above the ground from a completed well as viewed in FIG. 4.

Cabinet 12 includes a keypad 20, shown in more detail in FIG. 2, and an alpha-numeric liquid crystal display 22 mounted thereon.

A number of cables, one of which is cable 24, extend from the lower end of cabinet 12. The other end of cable 24 is connected to an alarm light 26 which may be mounted in a position easily viewable from a distance in order to provide an indication of an alarm condition, which will be hereinafter more fully described.

A cable 28 includes therein a set of leads which conduct electrical power from cabinet 12 to a preamplifier (not visible) received in housing 30 of the gun assembly. Another set of leads conducts signals generated by a transducer (not visible) received in housing 32 of the gun assembly. A third set of leads in cable 28 is connected to a pilot valve (not visible) in housing 34 of the gun assembly and momentarily opens the same responsive to a signal appearing on the leads associated therewith in cable 28.

A compressed air line 36 has one end connected to a compressor (not visible) received in cabinet 12 and the other end connected to an air reservoir 38. Cable 40 is connected to a source of 120 volt AC power which provides power to the electronics and air compressor in cabinet 12. A cable 42 connects control circuitry in cabinet 12 with a pump controller (not shown) which provides power to an oil well pump for pumping fluids from the well from which casing 18 extends. In one operating mode, the apparatus of the instant invention may be used to sense the fluid depth in the well and generate control signals on cable 42 for turning the pump on and off responsive to changes in the well fluid level. In another mode, the pump may be placed under the manual control of the operator. In still another mode, the operator can select a fixed period and a percentage of time for that period during which the pump will be on. In yet another mode, the operator can preselect times during the day in which the pump turns on and off. As will later become apparent, these modes are implemented by a keypad which provides signals to an electronic circuit.

A junction box 44 is mounted on top of valve housing 34. A cable 46 connects the junction box with preamplifier 30.

Describing generally the operation of gun assembly 16, pressurized air is provided via line 36 to reservoir 38. Responsive to a signal on cable 28, valve 34 opens and places the pressurized air in reservoir 38 in communication with the interior of casing 18. The abrupt opening of the valve creates an acoustic pulse in the casing which travels down the well bore. Whenever the cross-sectional area of the space through which the pulse travels decreases, a portion of the acoustic energy is reflected back to the surface. The transducer in housing 32 senses the pressure and detects the reflected pulses. An electrical signal proportional to the pressure is generated by the transducer. The electrical signal is amplified by the preamplifier in housing 30 and is transmitted to the electronics in cabinet 12 in cable 28 for analysis as will be described hereinafter in more detail. As will be explained, the signal can be analyzed to detect the pulse reflected from the surface of the well fluid and to determine the depth of the fluid in the well. In addition, the electronics in cabinet 12 may be used to shut the oil well pump on and off in order to maintain the fluid level within a preselected range.

Figure 3:
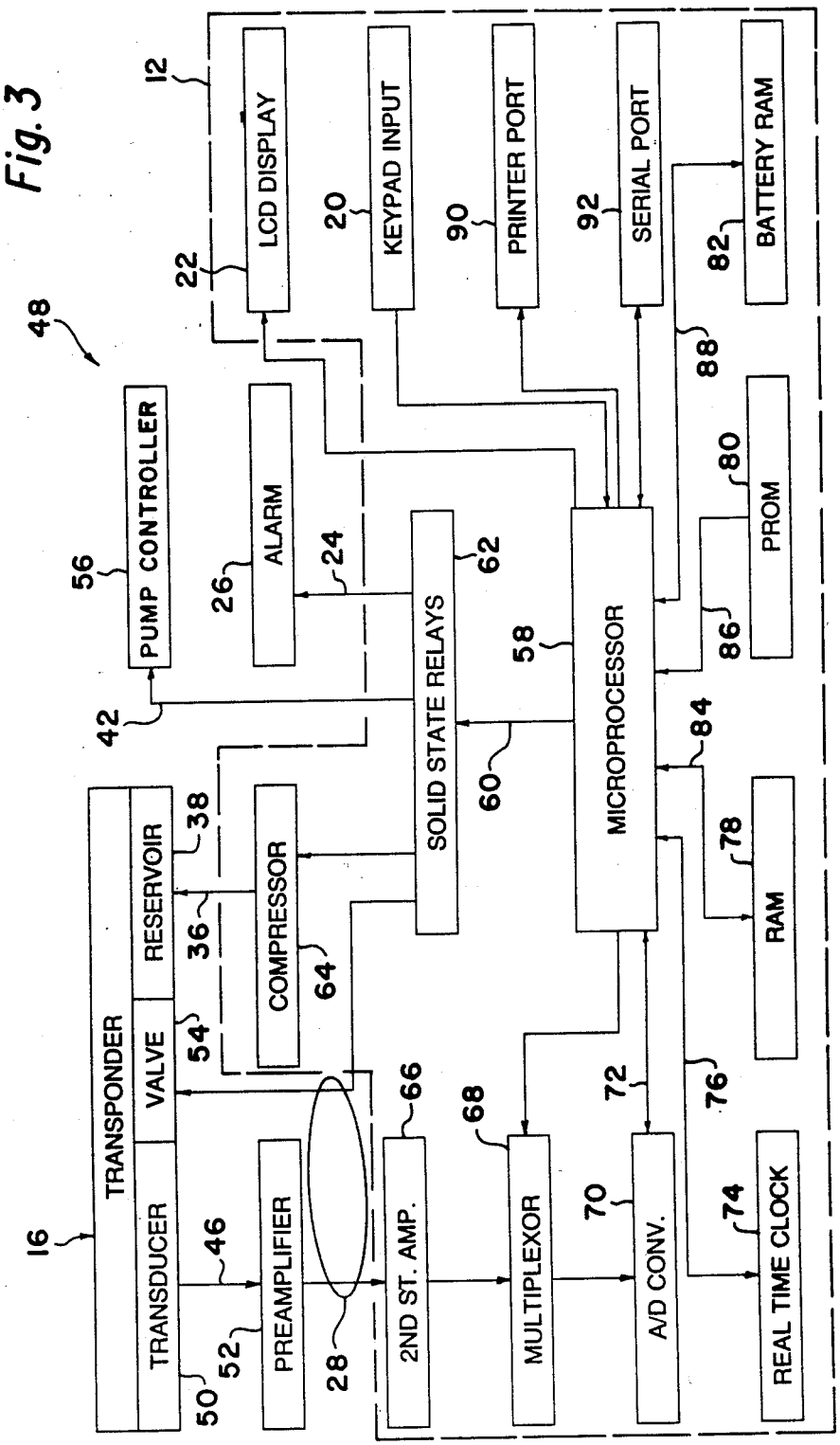
FIG. 3 is a block diagram of a portion of the instant embodiment of the invention.

Attention is directed to FIG. 3 wherein indicated generally at 48 is a block diagram of a portion of the instant embodiment of the invention. Components which have been previously identified in FIGS. 1 and 2 and which are illustrated in FIG. 3 retain the same identifying numeral therein.

As previously-mentioned, transponder 16 includes a transducer 50 received within housing 32, a preamplifier 52 received within housing 30, and a valve 54 received within housing 34. The transducer is referred to herein as pressure monitoring means or means for detecting reflected acoustic signals.

A pump controller 56 is connected to the electronics in cabinet 12 via cable 42. When the apparatus of the invention is used only to monitor fluid levels cable 42 need not be connected. As previously mentioned, pump controller 56 turns the oil well pump on and off responsive to signals applied by the electronics in cabinet 12 to cable 42.

A commercially available microprocessor 58 is connected to a number of other components as shown. For example, a bus 60 connects microprocessor 58 to a plurality of solid state relays 62. Each of the relays separately controls actuation of alarm light 26, pump controller 56, valve 54, and an air compressor 64.

The electrical signal generated by transducer 50 is transmitted via leads in cable 46 to preamplifier 52 and from the preamplifier to a conventional second stage amplifier 66 in cabinet 12. The second stage amplifier amplifies the preamplified signal and provides the same to one input port of a multi-port multiplexor 68. The multiplexor permits a number of different channels, under control of microprocessor 58, to be converted to digital values by analog-to-digital convertor 70 which are supplied to microprocessor 58 on bus 72. In the instant embodiment of the invention, the only analog signal provided to the multiplexor is the amplified transducer signal. Convertor 70 periodically samples the signal, converts the samples to digital values and provides the digital values to the microprocessor.

A real time clock 74 provides signals coded to indicate the time of day to the microprocessor on a bus 76. Three commercially available memories 78, 80, 82 are connected to the microprocessor data bus via busses 84, 86, 88, respectively. Memory 78 comprises a random access memory (RAM) for temporarily storing data which can be retrieved therefrom. Memory 80 comprises a programmable read only memory (PROM) which has encoded therein a software program for controlling microprocessor 58 which will be hereinafter described in more detail. RAM 78 and PROM 80 have voltage supplied thereto by a conventional power supply (not shown) in cabinet 12. In the event of a power failure, any data in RAM 78 is lost. The software program however is permanently encoded in PROM 80 and does not require power to retain the same therein. Memory 82 comprises a battery-powered random access memory (RAM) in which data can be temporarily stored and retrieved. The battery power supply retains data stored in memory 82 even in the event of a power failure to the rest of the components in cabinet 12.

A commercially available printer port 90 is provided to generate lists, tables, graphs and plots of data stored in memories 78, 82 as will be hereinafter more fully explained. A commercially available port 92 may be used to connect a computer or terminal to the microprocessor for displaying information appearing on display 22. Such information may be supplied to a portable terminal or computer at the well site or may be connected via a telemetry link to a remote computer or terminal. Selected data can be transferred from the apparatus via this link. In addition, information can be supplied to the apparatus on the link.

It should be understood that power supplies and their connections to the components shown in FIG. 3 are not shown nor are microprocessor control lines. Such connections are fully understood and may be readily made by a person having ordinary skill in the art.

Figure 4:
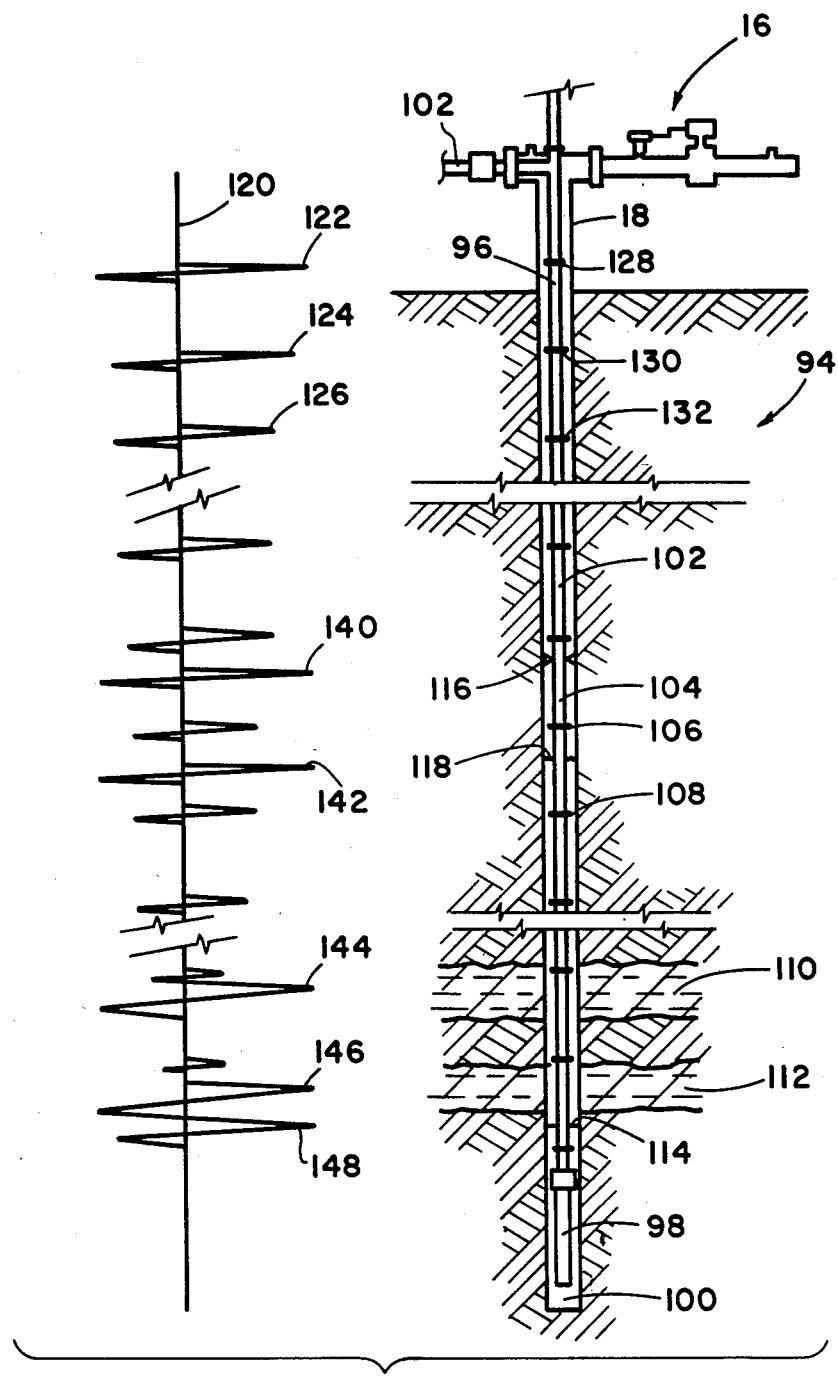
FIG. 4 is a somewhat schematic cross-sectional view of a well bore and an associated schematic view of an acoustic log generated by the instant embodiment of the invention.

Turning now to FIG. 4, indicated generally at 94 is a well which is lined with casing 18. Suspended therein is a string of production tubing 96 and a pump 98 which is connected to the lower end of tubing string 96. The pump pumps fluid 100 received in the well bore to the surface in tubing string 96. The produced fluids are typically provided to a storage tank or the like via a pipe 102.

The tubing string consists of a plurality of pipes, like pipes 102, 104 which include threaded upper and lower ends, referred to as collars, like collars 106, 108 which may be used to threadably engage one pipe with another as in the tubing string. Well 94 includes a pair of producing formations 110, 112 through which the well is bored. Casing 18 is perforated along the length thereof within each of formations 110, 112 to allow the fluids in the formation to enter the well bore. The areas in the casing adjacent the formations which are perforated are referred to as perforation zones. As can be seen, fluid enters the casing and collects at the lower end thereof from where it is pumped via pump 98 to the surface. A surface 114 of fluid 100 in the well defines a fluid level in the well which varies depending upon the rate of fluid inflow from the formations and upon the on and off cycling of pump 98.

A centralizer 116 is received in the annulus between casing 18 and tubing string 96. In a similar fashion, a tubing anchor 118 is received in the annulus. The centralizer maintains the tubing in a central portion of the well bore while anchor 118 is engaged between the tubing and the casing to fix the tubing position or to support the tubing weight in the event of a structural failure. There are many other types of well equipment which may be positioned in the annulus such as tubing liners, valves, landing nipples, etc.

Figure 5:
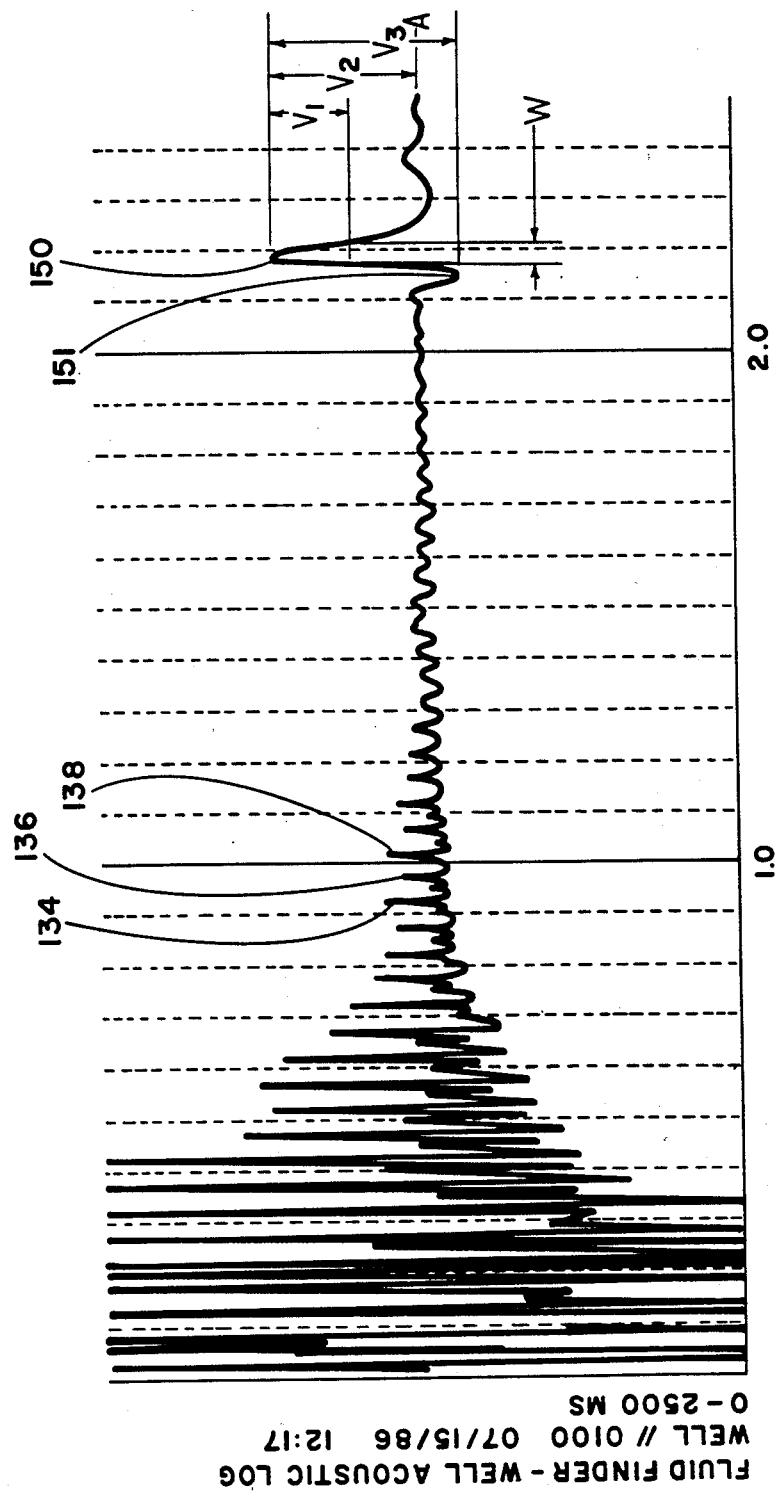
FIG. 5 is an acoustic log generated by the instant embodiment of the invention.

Prior to description of the operation of the apparatus of the instant invention, consideration will be given to data generated in response to an acoustic shot and in response to plurality of such shots. In FIG. 4, schematic representation of an acoustic log 120 produced as a result of a single acoustic shot from gun assembly 16 includes features which, as will later become apparent, are correlated to physical features in the well annulus. FIG. 5 depicts an actual representation of an acoustic log whereas log 120 is somewhat schematic for the purpose of illustrating characteristics of the log.

The transducer in the gun assembly converts the pressure generated by reflections from the acoustic pulse to an electrical signal which is amplified and processed to generate the log. The log is a graphic representation of the pressure detected by the transducer. The actual log produced by the instant embodiment of the invention is plotted on 8½ inch wide paper and may vary in length between about a foot for a relatively shallow well up to five to six feet and beyond for relatively deep wells. The log is initiated when an acoustic shot is initiated by gun 16. In FIG. 5, the vertical solid lines labled 1.0 and 2.0 represent the times one second and two seconds after the acoustic pulse is released in the well annulus. The first 400 milliseconds of the plot represent the time during which the valve in gun assembly 16 is open to release pressurized air into the well annulus. Pulses 122, 124, 126 in FIG. 4 represent acoustic pulse reflection from tubing collars 128, 130, 132, respectively. The log pulses are disposed opposite their associated tubing collars to illustrate the manner in which the log indicates the presence of a tubing collar. In FIG. 5, pulses 134, 136, 138, for example, indicate the presence of selected tubing collars in the tubing string.

It can be seen that the magnitude of each pulse indicating the presence of a tubing collar generally decreases with well depth because the reflected acoustic energy likewise decreases with well depth.

Pulses 140, 142 in log 120 indicate the presence of centralizer 116 and tubing anchor 118, respectively. The magnitude of the reflected pulses from the centralizer and the tubing anchor is usually greater than the magnitude of the surrounding tubing collars. This is so because the centralizer and tubing anchor block a greater portion of the cross-sectional area of the well annulus in the tubing collar and thus reflect more energy.

Pulses 144, 146 indicate reflected pulses from fluids entering the well in the perforation zones adjacent formations 110, 112. Finally, pulse 148 was created by the reflection from fluid surface 114. In FIG. 5, pulse 150 is a well fluid reflection pulse having a valley 151 with a peak-to-valley amplitude $V_3$. Baseline A represents steady state pressure in the casing with absolute peak size $V_2$ being measured from baseline A to the peak of pulse 150. Pulse width criteria, designated $V_1$, will be further discussed hereinafter.

Pulses generated by well equipment, such as centralizer 116 and tubing anchor 118 as well as pulses generated by influx of fluid at perforation zones are not shown in the log of FIG. 5.

As used herein, the term well event refers to equipment or other well anomalies, such as broken casing, which causes a change in pressure to be detected by the transducer.

Figure 6:
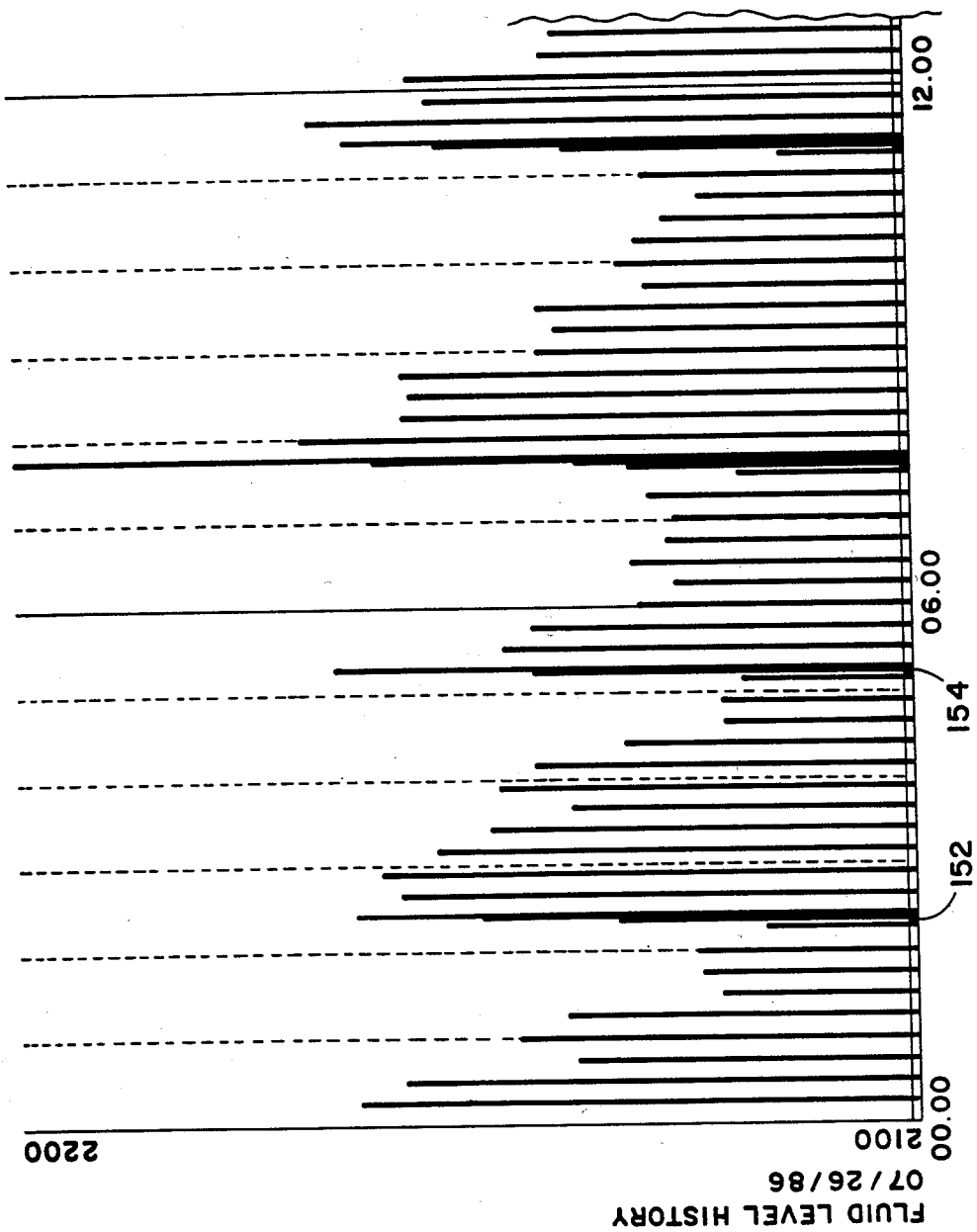
FIG. 6 is a fluid level and pump cycle history plot generated by the instant embodiment of the invention.

Turning now to FIG. 6, illustrated therein is a fluid level and pump cycle history graph, such comprising a graphical illustration of certain data generated by the apparatus of the instant invention. The fluid level history can be printed by the same commercially available printer as the acoustic log of FIG. 5. The vertical axis of the fluid level history represents well depth and in the graph of FIG. 6 represents depth between 2100 and 2200 feet in the well. The horizontal axis represents time beginning with midnight, 00:00 hours as indicated by a 24 hour clock, and ending at 12:00 noon. The plotter also prints the date of the fluid level history as shown. Each vertical bar represents a fluid depth in the well measured by a single acoustic shot in the manner which will be hereinafter more fully described. The fluid level history also includes a plot of the times during which the solid state relay connected to cable 42 in FIG. 4 is energized to provide a signal to turn the pump on. Darkened portions, two of which are portions 152, 154 along the time line at the bottom of the plot indicate times the pump was on. As can be seen in FIG. 6, during the times the pump is on, acoustic shots may be taken more frequently. The frequency of the acoustic shots during the times the pump is off and on can be programmed differently as will be described hereinafter in connection with the operation of the apparatus of the instant invention.

In addition to the acoustic log and the fluid level history, an event table (not shown) may be generated from data created by the apparatus of the instant invention and may be printed by the same printer used to print the log and the fluid level and pump cycle history. The event table indicates a date and time of day for each acoustic shot and prints the fluid level at the time the shot was taken. Printed with each fluid level is the round trip travel time of the acoustic pulse which generated the data from which the depth was calculated. The depth and the round trip time together may be used to determine the velocity of the acoustic pulse in the annulus at the time the shot was taken. In addition, the event table includes dates and times for pump on, pump off, power failures, and an alarm condition, which will be described in more detail hereinafter.

Consideration will next be given to some of the various system commands which a user may provide to the system via keypad 20 in connection with the use of the apparatus. Thereafter, more detailed consideration will be given to the processing of data generated by an acoustic pulse to determine fluid level.

Keypad 20 is used to enter a number of commands relating to, among other things, a description of various well parameters. Such parameters include an approximate velocity of an acoustic pulse in the well, the pump depth, the tubing tally, the high fluid level set point, the low fluid level set point, etc. The tubing tally comprises in essence a table which includes the number of pieces of tubing which make up the tubing string and the length of each piece of tubing. A typical length for each tubing pipe is 32.2 feet in length; however, it is not unusual to have shorter lengths of pipe near the bottom of the hole where the tubing string is connected to the pump or at the top of the well bore. For example, the first pipe might be 7.8 feet and the next pipe 10 feet and the next 190 tubes 32.2 feet in length. The total number of tubes of a selected length and the length of each is entered via keypad 20 and is stored in memory 78. Also entered via the keypad and ultimately stored in memory 82 is the depth of well events, such as centralizer 104 and tubing anchor 118. Finally, the starting depth and ending depth of each perforation zone, such as those adjacent formations 110, 112 are also ultimately stored in memory 82. Such data are used, as will later be explained in connection with the description of the operation of the software program, to calculate the fluid level in the well. In addition to the well parameters, information relating to the output of information on the printer, such as scaling factors are entered via the keypad and stored in memory. The keypad may also be used to display data on display 22, such as fluid level when the last shot has taken, time of the last shot, velocity of the last shot, etc In addition to the foregoing, criteria defining a pulse reflected from fluid in the well may be entered. Such criteria includes the relative magnitude, which is defined as being the ratio of the peak-to-valley magnitude of the pulse being analyzed, designated $V_3$, and the average of the three previous peak-to-valley magnitudes, such not being clearly discernible on the plot of FIG. 5 but which are readily detected using a conventional peak detection algorithm in the software program.

The second criteria is peak width. The fluid reflection pulse is typically a much lower frequency event than other well events which results in the peak being broader. The user may select the value W in FIG. 5 and the percentage peak-to-valley height at which W is measured i.e., $W=$width measured at $V_1/V_3$ 100. Entries may be also be made to select $V_3$ and $V_2$. As will later be explained in connection with the pulse analysis program, for a pulse to meet the criteria, the measured parameters of each pulse must exceed each of the foregoing user specified parameters.

Fluid surface reflection pulses can vary considerably in frequency content and magnitude from well to well. The apparatus of the invention may be used to tailor the criteria to the characteristic fluid reflection pulse for a given well. The above-discussed criteria are measured for the fluid pulse in a particular well, which may be identified on the acoustic log. Appropriate entries to the keypad cause the pulse criteria to be displayed thus assisting the operator in selecting the criteria for that well.

Directing attention now to FIGS. 7A and 7B, description will be made of the manner in which the software program stored in PROM 80 controls microprocessor 58 in order to generate an accurate indication of fluid depth, among other values. The start command as shown on the flow chart may be initiated by manual entry of an appropriate command on keypad 20 or may be automatically initiated as a result of a command specifying a periodic firing rate for the gun assembly. The start command initiates the appropriate one of solid state relays 62 which energizes compressor 64 thereby pressurizing reservoir 38. After the compressor has run for a preselected (by the user via keypad 20) time period, the compressor is shut off responsive to a signal from microprocessor 58. Thereafter, also responsive to a signal generated by the microprocessor, in response to the software program in PROM 80 the appropriate one of solid state relay 62 is energized thereby opening valve 54 and allowing the compressed air in reservoir 38 to enter the casing thus initiating an acoustic pulse. As can be seen in FIG. 5, the first three to four hundred milliseconds after the pulse is released include relatively high magnitudes as well as certain amount of noise generated by the opening and closing of valve 54. Pressure variations in the casing are monitored by transducer 50 which converts the same into proportional electrical signals that are amplified and ultimately applied via multiplexor 68 to analog-to-digital convertor 70 which samples the same approximately every two milliseconds in the instant embodiment of the invention, although of course different sampling rates may be used. The digitized samples are stored in RAM 78 for processing pursuant to the instructions in the software program.

After the digitized signal is stored, certain parameters are set up based on preselected operator inputs. For example, data from the tubing tally are used to calculate the approximate depth of each of the tubing collars in the tubing string and each depth so calculated is stored in a preselected memory position. In addition, a digital filter (described in more detail hereinafter) is set up.

After the parameters are set up, the transducer DC bias is subtracted in order to center the plot of the acoustic log on the graph as shown in FIG. 5 and to aid in subsequent analysis. Thus, although a zero baseline is not shown on FIG. 5, line A is drawn to indicate a baseline which is representative of the steady state casing pressure in the absense of pressure generated by the acoustic pulse.

The stored data are monitored to check for a large amplitude change within the first second after the microprocessor signals the opening of the valve. Detection of such a change is an indication that the acoustic pulse occurred and was sensed to verify proper operation of the equipment.

Next, the polarity of the signal may be inverted responsive to an instruction preselected by the operator. The polarity of the fluid surface pulse must be properly oriented in one direction (as shown in FIG. 5) for a portion of the program to properly process the signal. If, for example, the fluid level is at the lower end of a well having a cavity larger than the casing diameter, the pulse will be of the opposite polarity and the signal must be inverted.

After polarity is corrected, if necessary, a conventional digital filter incorporated into the software program is applied to the data. Electrical and mechanical noise varies significantly from well to well. In many cases the frequency band of the noise is different from the frequency band of the signal of the pulse reflected from the fluid surface. The data stored in RAM 78 is changed to eliminate much of the noise and when such data is later analyzed and plotted, the filtered signal is used.

After application of the filter, if it was determined, prior to polarity correction, that an acceptable acoustic log was generated, the program next corrects the log for delays in valve opening time by sensing the first large pulse (which indicates release of the compressed air) and measuring time therefrom. If an acceptable shot was not obtained, the system parameters, such as shot time, event, etc. are stored in memory 78 and the analysis has ended. The user may enter a preselected number of additional shots before an alarm condition is raised if good shots are not being detected. Failure to detect a good shot can be a result of a faulty compressor, a broken gun cable, a leaky compressed air line or poor installation of the transponder on the well. After a preselected number of additional shots, the alarm condition is raised. The system parameters are updated to indicate an alarm condition, the date and time of the alarm is stored in memory 82 and the alarm light relay, such being one of relays 62, is energized responsive to a command from the microprocessor.

If the shot is good, the log is shifted in time prior to analysis and display so that most of the time subsequent to a signal from microprocessor 58 which energizes solid stat relay 62 to open valve 54 and prior to full opening of the valve is eliminated. Thus, the first portion of the log is a rising signal toward the peak of the first high magnitude pulse. After the acoustic log is so shifted, the log is analyzed to detect the position of the peaks and valleys of each pulse relative to the first high magnitude pulse created by the shot as it enters the casing.

Continuing in FIG. 7B, after the relative times of the peaks and valleys are determined, a velocity estimate for the acoustic pulse is selected. This may be a preselected fixed number input by the operator in the event that a tubing tally is not entered or it may be determined from the tubing tally and from the relative positions of peaks and valleys in the log indicative of reflections from collars.

In calculating velocity, the depths of each of the tubing collars, which have been calculated based on the operator input tubing tally, is related to a corresponding peak in the log representative of the collar. Since the transducer signal is sampled at a fixed period of approximately every 2 milliseconds, the time between successive tubing collar peaks in the log is easily computed. A velocity between each pair of tubing collars is calculated by dividing twice the length between the collars indicated in the tubing tally by the time between the associated peaks in the acoustic log. It is necessary to double the length because the measured time to each collar is not the acoustic pulse travel time to the collar but rather the time to the collar and back to the transducer. Each velocity so calculated is compared with the preselected user input velocity which is an approximation of acoustic pulse velocity in the annulus. If the calculated velocity is more than 15% different from the preselected user input velocity, the estimate is discarded. If not, the estimate is retained and a velocity estimate for the pulse travel time between the next lower pair of tubing collars is calculated.

Velocity estimates are grouped into blocks of successive estimates. In other words, if, e.g., for ten consecutive pairs of tubing collars good velocity estimates are generated, all such velocity estimates are retained as a group. If the next estimate should be different from the preselected stored velocity estimate by 15%, the same would be discarded. The velocity estimate for the next successively downward pair of tubing collars is then generated and, if good, retained in a second block of estimates which is made up of each succeeding valid velocity estimate.

A velocity estimate might be off by a significant factor because the collar depths generated pursuant to the tubing tally may not be associated with the peak in the log corresponding to that particular collar but may be one or two collars off all the way up and down the string. This situation can arise because the program includes a mute depth feature which prevents velocity calculations above a preselected depth due to the high magnitude signals and noise present in the log at shallow depths. If, for example, the mute depth is set to 400 feet, the preselected stored velocity is divided into 400 feet to estimate the time on the log corresponding to a depth of 400 feet. For all times greater than the estimated time, tubing collars are correlated with log peaks representative of tubing collars to estimate velocity as described above. Typically at the mute depth each of the pipes in the tubing string is the same length and is equal to the length, typically about 30 feet, stored in the tubing tally for the great majority of pipes in the string. However, it is possible that a short pipe could appear in the middle of the string. If the tubing collars are aligned with their corresponding tubing collar pulses, the correct velocity estimate will be generated even for the short pipe. If not, the incorrect estimate is discarded and creation of a new block of estimates is begun. After such blocks are created along the entire length of the tubing string, a velocity estimate is generated for each block beginning with the top tubing collar in the block and ending with the bottom tubing collar. Estimating velocities over a length longer than a single pipe reduces the percentage of error in the velocity estimation. After an estimate for each block is so generated, each estimate is weighted by a factor equal to the number of pipes in the block and thereafter each of the weighted blocks is averaged to generate a single velocity estimate for the acoustic pulse.

In a well which has no tubing string, the operator input preselected estimated velocity is used, as shown in the flow chart, to generate the velocity estimate.

Next, in the case when velocity is calculated from the tubing tally and acoustic log peaks, the velocity is filtered or a weighted average is taken with a preselected number of velocity estimates computed for a preselected number (at the keypad) of preceding acoustic shots up to 16. Such averaging smooths the rate of change of velocity estimates from shot to shot and produces more precise estimates. One type of averaging which may be used is a frequency domain averaging technique which is familiar to persons having ordinary skill in the art.

Once a final velocity estimate is obtained, whether through a preselected user input velocity or through calculation of the velocity from tubing tally and collar peaks and filtering (if desired), the peaks are scanned to select a set of peaks which are bigger than the immediately preceding peak. A fluid level reflection peak virtually always follows a smaller peak. Since the fluid completely obstructs the annulus and reflects substantially all of the acoustic energy back up the well, the peak reflected from the fluid will be larger than a peak reflected from a preceding tubing collar or other partial annulus obstruction.

All of the peaks so selected are next analyzed to measure the criteria defining a peak reflected from fluid, namely relative magnitude, peak width, peak-to-valley magnitude and absolute peak size, as previously described. Thereafter, every peak which falls within a well event, such as peaks 140, 142 on log 120 which correspond to centralizer 116 and tubing anchor 118, respectively, are masked or temporarily removed from the set of interest. In a similar fashion, peaks 144, 146 which occur within the perforation zones are likewise temporarily masked from further consideration. As will be recalled, data relating to the well events and perforation zones was entered by the use via keypad 20 and stored in memory to facilitate masking as above-described. Thereafter, the program looks for the shallowest unmasked event which meets all the criteria. Such an event, if found, is identified as the fluid pulse and is converted to a depth by multiplying the velocity estimate (or the preselected fixed velocity) times the time of occurrence of the peak. The depth is stored along with the time of the shot in RAM 82 and may be later printed out in the event table or the fluid level history table pursuant to an operator command entered on keypad 20.

The shallowest unmasked event which meets the criteria is selected because later occurring unmasked events may be produced by multiple reflections. Such reflections are generated when the pulse travels to the fluid level, is reflected therefrom and is again reflected back downwardly by well events, perforation zones, tubing collars, etc. These later reflections, after the first acoustic pulse reflection from the fluid surface, appear on the log after the actual fluid reflection pulse. Selecting the shallowest pulse which meets all the fluid pulse criteria, reduces the probability of selecting a multiple reflection pulse.

In the event that there is no unmasked pulse which meet the preselected criteria, the program assumes that the fluid depth is in a perforation zone or near a well event and that the pulse occurred but was not detected earlier in the routine because it was masked. If no unmasked pulse which meets the criteria is detected, all well events and perforation zones are unmasked and the program searches for and locates the deepest pulse which meets all the criteria. In this case the deepest event is selected because all the deeper well events are submerged in the well fluid and therefore do not generate reflections.

After the fluid pulse is so identified it is converted to depth as previously described, the system parameters for time, depth, calculated velocity, valve opening time, and the D.C. bias are updated, and the analysis is ended. As in the case when no acoustic pulse is detected, if no fluid level pulse is identified after a preselected number (via the keypad) of acoustic pulses, an alarm condition is generated thus energizing the alarm condition relay, such being one of relays 62, and storing the time, date and alarm condition in memory 82.

Another feature which can be programmed by the operator relates to selection o a backup pump control mode in the event of a preselected (via the keypad) number of alarm conditions. For example, if the pump is being controlled by the fluid level and if, e.g., 5 successive acoustic pulses generate alarm conditions, whether from failure to detect an acoustic pulse or from failure to identify a fluid level, the pump control method can be programmed to switch to, e.g., the percentage time method of pump control. This insures that the pump is always udder control.

Three important user selected parameters may be input via the keypad to automatically control the level of the well, namely, a low set point, pump depth, and a high set point. The microprocessor is programmed, although not shown in the flow chart, to automatically start the pump when the fluid level is above the high set point and stop the pump when the fluid level reaches the low set point. The user may also select different frequencies at which shots are fired to detect levels for the period that the pump is on and for the period that the pump is off.

It can thus be seen that the instant invention provides an accurate method and apparatus for measuring fluid level in a well and thus for controlling a pump on the well. Since velocity is calculated for each acoustic shot, changes in gas composition pressure, and temperature are reflected in a newly calculated velocity estimate for each shot thus minimizing errors in depth calculation. In addition, the pulse indicative of the fluid level is very accurately selected by comparing pulses in the log against the predetermined criteria of a fluid pulse for the particular well. Such use of the predetermined criteria in combination with the method for masking and unmasking well events and perforation zones greatly minimizes the possibility that a multiple reflection, a pulse reflected from a well event, or perforation zone or a noise generated pulse will be mistakenly selected as the pulse reflected from the fluid surface.

Although a listing of the software program stored in PROM 80 is not disclosed herein, a programmer having ordinary skill in the art could write a program, in one of a number of different ways, which would implement the steps described in the flow chart and described herein. Such a program could be so written without undue effort or experimentation.

It is to be appreciated that additions and modifications may be made to the instant embodiment of the invention without departing from the spirit thereof which is defined in the following claims.

We claim:

1. A method for generating data indicative of fluid depth in a well, said method comprising the steps of:
   initiating an acoustic pulse at the top of the well;
   continuously monitoring the pressure in the well adjacent the top thereof for reflected pulses indicative of acoustic pulse reflections produces by variations in the cross-sectional area of the well;
   periodically sampling the electrical signal;
   storing each sample in a memory device;
   processing the stored samples to generate a velocity estimate of the acoustic pulse; and
   using the velocity estimate to calculate the well depth from which a selected pulse was reflected.

2. The method claim 1 wherein said method further includes the steps of processing the stored samples to determine the time between initiating said acoustic pulse and the time at which the pulse reflection from fluid in the well is detected adjacent the top of the well.

3. The method of claim 1 wherein said method further includes the steps of plotting the stored samples on a graph.

4. A method for generating data indicative of fluid depth in a well wherein said well includes a string of production tubing having a plurality of tubing collars disposed at known intervals therealong, said method comprising the steps of:
   initiating an acoustic pulse at the top of the well;
   continuously monitoring the pressure in the well adjacent the top thereof for reflected pulses indicative of acoustic pulse reflections produced by variations in the cross-sectional area of the well;
   periodically sampling the electrical signal;
   storing each sample in a memory device;
   processing the stored data to determine the time between pulses reflected from selected tubing collars; and
   generating a velocity estimate of the acoustic pulse.

5. The method of claim 4 wherein the step of generating a velocity estimate of the acoustic pulse comprise the step of dividing twice the distance between the selected tubing collars by the time between pulses reflected from the selected tubing collars.

6. The method of claim 5 wherein the step of generating a velocity estimate of the acoustic pulse comprises the step of generating a velocity estimate of the acoustic pulse between adjacent tubing collars.

7. The method of claim 6 wherein said method further comprises the step of generating velocity estimates of the acoustic pulse between a plurality of adjacent pairs of tubing collars.

8. The method of claim 7 wherein said method further comprises the step of using the velocity estimates so generated to calculate an average velocity estimate.

9. A method for generating data indicative of fluid depth in a well, said method comprising the steps of:
   initiating an acoustic pulse at the top of the well;

continuously monitoring the pressure in the well adjacent the top thereof for reflected pulses indicative of acoustic pulse reflections produced by variations in the cross-sectional area of the well;
periodically sampling the electrical signal;
storing each sample in a memory device;
preselecting criteria associated with a pulse reflected from fluid in the well; and
comparing monitored pulses with the preselected criteria to identify the well fluid reflection pulse.

10. The method of claim 9 wherein said method further includes the step of:
detecting the peak of each reflected pulse prior to the step of comparing monitored pulses with preselected criteria; and
performing the step of comparing monitored pulses with preselected criteria only on monitored pulses having peaks greater than the immediately preceding monitored pulse.

11. A method for generating data indicative of fluid depth in a well wherein said well includes a string of production tubing having a plurality of tubing collars disposed at known intervals therealong, said method comprising the step of:
initiating an acoustic pulse at the top of the well;
continuously monitoring the pressure in the well adjacent the top thereof for reflected pulses indicative of acoustic pulse reflections produced by variations in the cross-sectional area of the well;
periodically sampling the electrical signal;
storing each sample in a memory device; and
calculating an acoustic pulse velocity estimate as a function of acoustic pulse travel time between selected tubing collars and the distance between the selected tubing collars.

12. The method of claim 11 wherein said method further includes the step of calculating the fluid depth by multiplying the velocity estimate by the time between initiating said acoustic pulse and the time at which the pulse reflection from fluid in the well is detected adjacent the top of the well.

13. The method of claim 12 wherein said method further includes the step of filtering the velocity estimates for a plurality of consecutive initiated acoustic pulses and calculating the fluid level from which the last initiated pulse was reflected as a function of the filtered velocity estimate and the last acoustic pulse travel time.

14. The method of claim 12 wherein said method further comprises initiating a plurality of acoustic pulses and storing the thus calculated fluid depths for each acoustic pulse.

15. The method of claim 14 wherein said method further includes the step of controlling a well pump responsive to the calculated fluid depths.

16. A method for generating data indicative of fluid depth in a well wherein said well includes a string of production tubing having a plurality of tubing collars disposed at known intervals therealong, said method comprising the steps of:
initiating an acoustic pulse at the top of the well;
continuously monitoring the pressure in the well adjacent the top thereof for reflected pulses indicative of acoustic pulse reflections produced by variations in the cross-sectional area of the well;
periodically sampling the electrical signal;
storing each sample in a memory device;
generating a set of data including the distance between each tubing collar in the tubing string;
processing the stored samples to detect the peak of pulses reflected from a tubing collar;
measuring the time between selected pulse peaks; and
calculating an acoustic pulse velocity estimate using the tubing collar data set and the measured time.

17. The method of claim 16 wherein said method further includes the step of determining the time between initiation of said acoustic pulse and the time at which a pulse reflected from fluid in the well is detected adjacent the top of the well, multiplying the time so determined by the acoustic pulse velocity estimate, and dividing by two.

18. A method for controlling a pump in a well including means for initiating an acoustic pulse in a well adjacent the top thereof and means for detecting reflected pulses indicative of acoustic pulse reflections produced by variations in the cross-sectional area of the well, said method comprising the steps of:
establishing criteria defining a pulse reflected from fluid in the well;
initiating a plurality of acoustic pulses;
for each acoustic pulse:
detecting the reflected pulses;
creating a set of pulses which meet the established criteria;
removing pulses from the set which occur adjacent known well anomalies such as well equipment, perforation zones and the like;
selecting the first occurring pulse remaining in the set; and
determine the depth from which the first occurring pulse was reflected based on acoustic pulse velocity and travel time; and
switching the pump on when the depth so determined is above a preselected depth; and
switching the pump off when the depth so determined is below a preselected depth.

19. The method of claim 18 wherein when after the step of removing pulses from the set which occur adjacent known well anomalies there are no pulses remaining in the set, said method further comprising the steps of:
returning the removed pulses to the set;
selecting the last occurring pulse in the set;
determining the depth from which the last occurring pulse was reflected based on acoustic pulse velocity and travel time; and
switching the pump on when the depth so determined is above a preselected depth; and
switching the pump off when the depth so determined is below a preselected depth.

20. Apparatus for generating data indicative of fluid depth in a well, said apparatus comprising:
means for initiating an acoustic pulse at the top of the well;
means for continuously monitoring the pressure in the well adjacent the top thereof for reflected pulses indicative of acoustic pulse reflections produced by variations in the cross-sectional area of the well;
means for periodically sampling the electrical signal;
means for storing each sample in a memory device;
means for processing the stored samples to generate a velocity estimate of such an acoustic pulse; and
means for using the velocity estimate to calculate the well depth from which a selected pulse was reflected.

21. The apparatus of claim 20 wherein said apparatus further includes means for processing the stored samples to determine the time between initiating said acoustic pulse and the time at which the pulse reflection from fluid in the well is detected adjacent the top of the well.

22. The apparatus of claim 20 wherein said apparatus further includes the means for plotting the stored samples on a graph.

23. Apparatus for generating data indicative of fluid depth in a well wherein said well includes a string of production tubing having a plurality of tubing collars disposed at known intervals therealong, said apparatus comprising:
   means for initiating an acoustic pulse at the top of the well;
   means for continuously monitoring the pressure in the well adjacent the top thereof for reflected pulses indicative of acoustic pulse reflections produced by variations in the cross-sectional area of the well;
   means for periodically sampling the electrical signal;
   means for storing each sample in a memory device;
   means for processing the stored data to determine the time between pulses reflected from selected tubing collars; and
   means for generating a velocity estimate of the acoustic pulse.

24. The apparatus of claim 23 wherein said means for generating a velocity estimate of the acoustic pulse comprises means for dividing twice the distance between the selected tubing collars by the time between pulses reflected from the selected tubing collars.

25. The apparatus of claim 24 wherein said means for generating a velocity estimate of the acoustic pulse comprises means for generating a velocity estimate of the acoustic pulse between adjacent tubing collars.

26. The apparatus of claim 25 wherein said apparatus further comprises means for generating velocity estimates of the acoustic pulse between a plurality of adjacent pairs of tubing collars.

27. The apparatus of claim 26 wherein said apparatus further comprises means for using the velocity estimates so generated to calculate an average velocity estimate.

28. Apparatus for generating data indicative of fluid depth in a well, said apparatus comprising:
   means for initiating an acoustic pulse at the top of the well;
   means for continuously monitoring the pressure in the well adjacent the top thereof for reflected pulses indicative of acoustic pulse reflections produced by variations in the cross-sectional area of the well;
   means for periodically sampling the electrical signal;
   means for storing each sample in a memory device;
   means for preselecting criteria defining a pulse reflected from fluid in the well; and
   means for comparing monitored pulses with the preselected criteria to identify the well fluid reflection pulse.

29. The apparatus of claim 28 wherein said apparatus further includes:
   means for detecting the peak of each reflected pulse prior to the step of comparing monitored pulses with said preselected criteria; and
   means for performing the step of comparing monitored pulses with preselected criteria only on monitored pulses having peaks greater than the immediately preceding monitored pulse.

30. Apparatus for generating data indicative of fluid depth in a well wherein said well includes a string of production tubing having a plurality of tubing collars disposed at known intervals therealong, said apparatus comprising:
   means for initiating an acoustic pulse at the top of the well;
   means for continuously monitoring the pressure in the well adjacent top thereof for reflected pulses indicative of acoustic pulse reflections produced by variations in the cross-sectional area of the well;
   means for periodically sampling the electrical signal;
   means for storing each sample in a memory device; and
   means for calculating an acoustic pulse velocity estimate as a function of acoustic pulse travel time between selected tubing collars and the distance between the selected tubing collars.

31. The apparatus of claim 30 wherein said apparatus further includes means for calculating the fluid depth by multiplying the velocity estimate by the time between initiating said acoustic pulse and the time at which the pulse reflection from fluid in the well is detected adjacent the top of the well.

32. The apparatus of claim 31 wherein said apparatus further includes means for filtering the velocity estimates for a plurality of consecutive initiated acoustic pulses and calculating the fluid level from which the last initiated pulse was reflected as a function of the filtered velocity estimate and the last acoustic pulse travel time.

33. The apparatus of claim 31 wherein said apparatus further comprises means for initiating a plurality of acoustic pulses and storing the thus calculated fluid depths for each acoustic pulse.

34. The apparatus of claim 33 wherein said apparatus further includes the step of controlling a well pump responsive to the calculated fluid depths.

35. Apparatus for generating data indicative of fluid depth in a well wherein said well includes a string of production tubing having a plurality of tubing collars disposed at known intervals therealong; said apparatus comprising:
   means for initiating an acoustic pulse at the top of the well;
   means for continuously monitoring the pressure in the well adjacent the top thereof for reflected pulses indicative of acoustic pulse reflections produced by variations in the cross-sectional area of the well;
   means for periodically sampling the electrical signal;
   means for storing each sample in a memory device;
   means for generating a set of data including the distance between each tubing collar in the tubing string;
   means for processing the stored samples to detect the peak of pulses reflected from a tubing collar;
   means for measuring the time between selected pulse peaks; and
   means for calculating an acoustic pulse velocity estimate using the tubing collar data set and the measured time.

36. The apparatus of claim 35 wherein said apparatus further includes:
   means for determining the time between initiation of said acoustic pulse and the time at which a pulse reflected from fluid in the well is detected adjacent the top of the well;

means for multiplying the time so determined by the acoustic pulse velocity estimate; and means for dividing the product by two.

37. Apparatus for controlling a pump in a well including means for initiating an acoustic pulse in a well adjacent the top thereof and means for detecting reflected pulses indicative of acoustic pulse reflections produced by variations in the cross-sectional area of the well, said apparatus comprising:

means for establishing criteria defining a pulse reflected from fluid in the well;

means for initiating a plurality of acoustic pulses;

means for creating a set of reflected pulses after each initiated pulse which meet the established criteria;

means for removing such reflected pulses from the set which occur adjacent known well anomalies such as well equipment, perforation zones and the like;

means for selecting the first occurring reflected pulse remaining in the set;

means for determining the depth from which the first occurring pulse was reflected based on acoustic pulse velocity and travel time;

means for switching the pump on when the depth so determined is above a preselected depth; and means for switching the pump off when the depth so determined is below a preselected depth.

38. The apparatus of claim 37 wherein said apparatus further comprises:

means for returning the removed pulses to the set;

means for selecting the last occurring pulse in the set;

means for determining the depth from which the last occurring pulse was reflected based on acoustic pulse velocity and travel time;

means for switching the pump on when the depth so determined is above a preselected depth; and means for switching the pump off when the depth so determined is below a preselected depth.

39. Apparatus for determining the fluid depth in well bore comprising:

means for initiating an acoustic pulse at the top of the well;

means for detecting reflected acoustic signals produced by variations in the cross-sectional area of the well, said detecting means being located at the top of the well;

means for converting the reflected acoustic signals to analog electrical signals;

means for periodically sampling the level of the analog electrical signals;

means for converting each sampled level to a digital value;

memory means for storing each digital value;

preselected criteria defining an acoustic signal reflected from the fluid surface in the well; and means for measuring said electrical signals for determining the presence or absense preselected criteria.

40. The apparatus of claim 39 wherein said apparatus further includes printer means for generating an output based on data stored in said memory device.

41. The apparatus of claim 40 wherein said output comprises a graph of the fluid levels in the well for a preselected period.

42. The apparatus of claim 39 wherein said apparatus further includes means for processing the digital values in said memory device.

43. The apparatus of claim 39 wherein said well bore includes a string of production tubing having a plurality of tubing collars disposed at known intervals therealong and said apparatus further comprises:

means for storing data indicative of the location of each tubing collar; and means for correlating each acoustic signal reflected from a tubing collar with the location of the collar from which the signal is reflected.

* * * * *